(12) United States Patent
Keohane et al.

(10) Patent No.: US 8,041,955 B2
(45) Date of Patent: *Oct. 18, 2011

(54) GRID MUTUAL AUTHORIZATION THROUGH PROXY CERTIFICATE GENERATION

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

This patent is subject to a terminal disclaimer.

(21) Appl. No.: 12/266,972

(22) Filed: Nov. 7, 2008

(65) Prior Publication Data
US 2009/0070591 A1 Mar. 12, 2009

Related U.S. Application Data

(63) Continuation of application No. 10/809,551, filed on Mar. 25, 2004, now Pat. No. 7,467,303.

(51) Int. Cl.
*G06F 21/00* (2006.01)
(52) U.S. Cl. ........ 713/185; 713/150; 713/168; 713/169; 713/170; 713/171; 713/172; 713/173; 713/174; 713/175; 713/176; 713/182; 709/238; 709/250; 726/5; 726/6; 726/7; 726/10; 726/18
(58) Field of Classification Search .................. 713/185, 713/156, 168–176, 150, 182; 726/68, 10, 726/5–7, 18; 709/250, 238
See application file for complete search history.

(56) References Cited

U.S. PATENT DOCUMENTS
4,227,253 A 10/1980 Ehrsam et al.
(Continued)

FOREIGN PATENT DOCUMENTS
EP 1282289 A2 2/2003
(Continued)

OTHER PUBLICATIONS

Browne, J."Grid Computing as Applied Distributed Computation: A Graduate Seminar on Internet and Grid computing", 2004 IEEE international Symposium on Cluster Computing and the Grid, Apr. 19-22, 2004, pp. 239-245.*

(Continued)

*Primary Examiner* — Kambiz Zand
*Assistant Examiner* — Tongoc Tran
(74) *Attorney, Agent, or Firm* — Yee & Associates, P.C.; Matthew W. Baca

(57) ABSTRACT

A mechanism for mutual authorization of a secondary resource in a grid of resource computers is provided. When a primary resource attempts to offload a grid computing job to a secondary resource, the primary resource sends a proxy certificate request to the user machine. Responsive to a proxy certificate request, the user machine performs authorization with the secondary resource. If authorization with the secondary resource is successful, the user machine generates and returns a valid proxy certificate. The primary resource then performs mutual authentication with the secondary resource. If the authorization with the secondary resource fails, the user machine generates and returns an invalid proxy certificate. Mutual authentication between the primary resource and the secondary resource will fail due to the invalid proxy certificate. The primary resource then selects another secondary resource and repeats the process until a resource is found that passes the mutual authorization with the user machine.

8 Claims, 5 Drawing Sheets

U.S. PATENT DOCUMENTS

| | | | |
|---|---|---|---|
| 5,564,016 A | | 10/1996 | Korenshtein |
| 5,796,830 A * | | 8/1998 | Johnson et al. ............... 380/286 |
| 6,304,967 B1 | | 10/2001 | Braddy |
| 6,754,829 B1 * | | 6/2004 | Butt et al. ........................ 726/8 |
| 7,222,187 B2 | | 5/2007 | Yeager et al. |
| 2001/0014943 A1 * | | 8/2001 | Wray ............................ 713/157 |
| 2005/0240765 A1 * | | 10/2005 | Genty et al. ................. 713/175 |

FOREIGN PATENT DOCUMENTS

| | | |
|---|---|---|
| JP | 2001344207 | 12/2001 |
| JP | 2002335239 | 11/2002 |
| JP | 2003030150 | 1/2003 |
| JP | 2009514046 | 4/2009 |

OTHER PUBLICATIONS

Ong et al., "Grid-Based Decision Support with Pro-Active Mobile Computing", Proceedings of the 2005 IEEE International conference on Services Computing (SCC '05). 0/7695-2408-7/05, IEEE.*

Niinimaki et al., "Using Virtual Organizations Membership System with EDG's Grid Security and Database Access", Proceedings of the 15th International Workshop on Database and Expert Systems Applications (DEXA'04). 1529-4188/04, IEEE.*

Low et al., "Self Authenticating Proxies", Computer Journal, Oxford University Press, Surrey, GB, vol. 37, No. 5, Jan. 1994, pp. 422-428.

Gasser et al., "An Architecture for Practical Delegation in a Distributed System", Proceedings of the Symposium on Research in Security and Privacy, Oakland, May 1990, IEEE Computer Society Press, US, vol. Symp. 11, pp. 20-30.

Ding et al., "A New Approach for Delegation Using Hierarchical Delegation Tokens", Technical Report TR-95-5-E, Apr. 1995, pp. 1-14.

Low et al., "A Joint Authorization Scheme", Jan. 1997, ACM SIGOPS Operation Systems Reviews, vol. 31, Issue 1, pp. 88-96.

* cited by examiner

GRID MUTUAL AUTHORIZATION THROUGH PROXY CERTIFICATE GENERATION

This application is a continuation of application Ser. No. 10/809,551, filed Mar. 25, 2004, status allowed.

BACKGROUND OF THE INVENTION

1. Technical Field

The present invention relates to data processing and, in particular, to grid computing. Still more particularly, the present invention provides a method, apparatus, and program for grid mutual authorization through proxy certificate generation.

2. Description of Related Art

Grid computing is the sharing of central processing unit (CPU) resources across a network so that a plurality of machines function as one large supercomputer. Grid computing, also referred to as peer-to-peer computing or distributed computing, allows unused CPU capacity in any of the machines to be allocated to the total processing job required.

In a large enterprise, hundreds or thousands of desktop machines may be sitting idle at any given moment. A CPU may be considered idle even when a user is reading the screen and not interacting with the machine. Other computing resources may be idle at various times of the day. For example, a cluster of database servers, or a subset thereof, may be unused during non-business hours, for example during the middle of the night. Case in point, during peek business hours in New York City, most people are likely to be asleep in India. Therefore, at any time of the day there may be unused processing cycles that could be put to use on large computational problems.

A given user may run a computationally intensive job using grid technology. For example, the user may have a biotechnology project, such as a human genome research project. A job may be any program that may run for two days or may simply ask the resource machine for the time of day. However, grid computing is typically used for very computationally intensive jobs. A user may send a job to a resource machine and go home for the night or the weekend. A resource machine will then process the job and return the results to the user.

The user may select a particular machine in a grid to run the job. The user may know of a specific machine that the user trusts. For example, the user may know of a machine with unused capacity that has updated security patches, a secure operating system, etc. Alternatively, a user may submit a job to a grid scheduler that selects a host (resource) to process the job. If a user sends a job to a grid scheduler, the user is presumed to trust the scheduler to send the job to the right host.

Of course, grid computing may bring up security problems. For instance, a resource machine may become overburdened. In this case, the primary resource machine may offload work to a secondary resource machine. The user that submitted the job may not necessarily trust the secondary resource or host. The IP of the job, the program being run, input data, output data, etc. are all available to the secondary untrusted host. This represents an unauthorized risk or cost to the user in terms of security. However, once the job is submitted to a primary resource, the user has no control over which machine in the grid ultimately processes the job. Consequently, the secondary resource machine that processes the job may lack the desired, or even necessary, security levels. The machine may have an operating system that is vulnerable to virus attacks or spyware. Or the secondary resource may be malicious and steal the results or the Internet protocol (IP) address of the grid job.

SUMMARY OF THE INVENTION

The present invention recognizes the disadvantages of the prior art and provides a mechanism for mutual authorization of a secondary resource in a grid of resource computers. Grid security often uses certificates and proxy certificates to identify users. When a primary resource machine attempts to offload a grid computing job to a secondary resource, the primary resource machine sends a proxy certificate request to the user machine. Responsive to a proxy certificate request, the user machine performs an authorization job on the secondary resource machine. If the authorization with the secondary resource machine is successful, the user machine generates and returns a valid proxy certificate. The primary resource machine then performs mutual authentication with the secondary resource machine using the proxy certificate. However, if the authorization with the secondary resource machine is not successful, the user machine generates and returns an invalid proxy certificate. The primary resource then performs mutual authentication with the secondary resource machine; however, the authentication will fail due to the invalid proxy certificate. The primary resource will then select another secondary resource and repeat the process until a resource is found that passes the mutual authorization with the user machine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
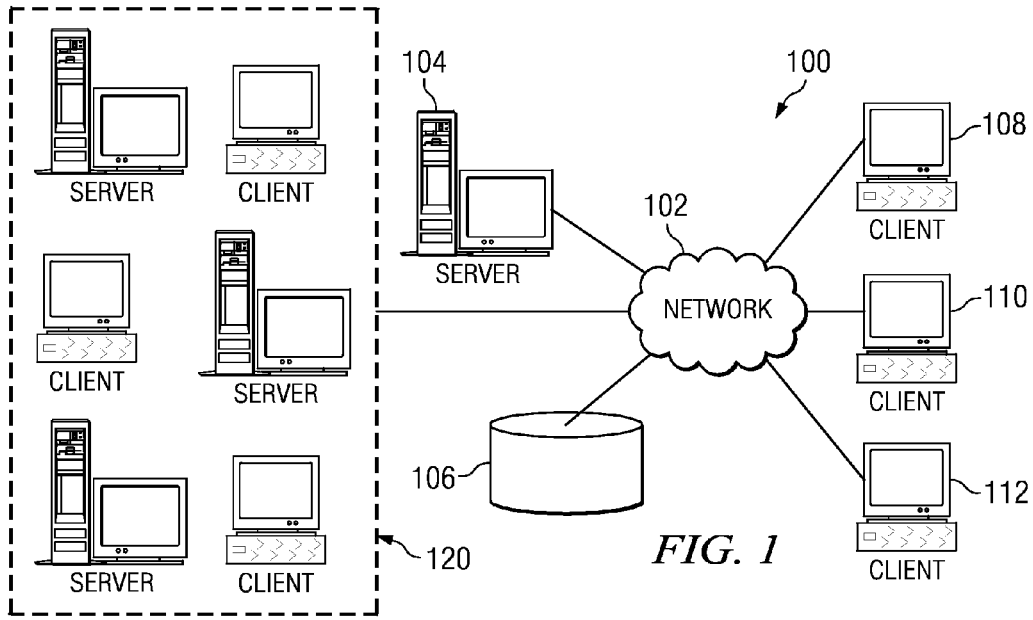
FIG. 1 depicts a pictorial representation of a network of data processing systems in which the present invention may be implemented.
Figure 2:
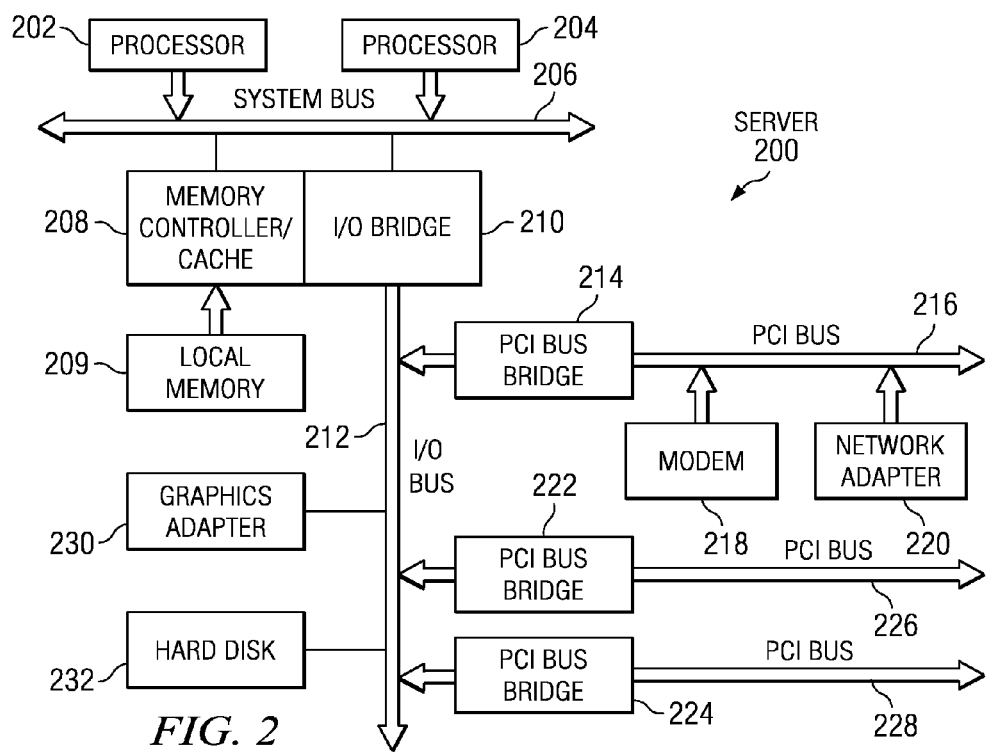
FIG. 2 is a block diagram of a data processing system that may be implemented as a server in accordance with a preferred embodiment of the present invention.
Figure 3:
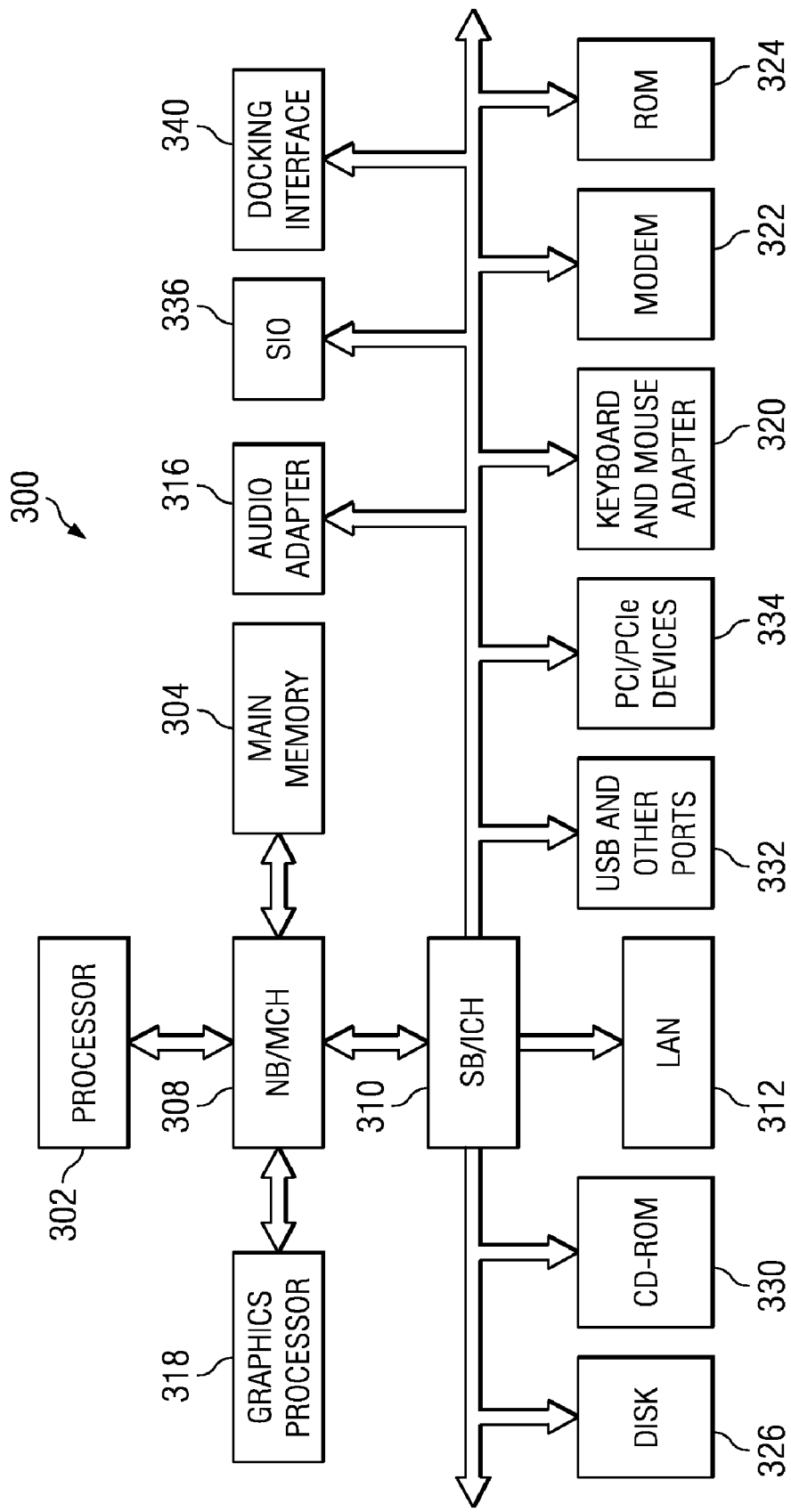
FIG. 3 is a block diagram of a data processing system in which the present invention may be implemented.

The present invention provides a method, apparatus and computer program product for mutual authorization of a secondary resource in a grid of resource computers. The data processing device may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

More particularly, network data processing system 100 includes grid 120 that is a grid of computing systems. Grid computing is the sharing of central processing unit (CPU) resources across a network so that a plurality of machines function as one large supercomputer. Grid computing, also referred to as peer-to-peer computing or distributed computing, allows unused CPU capacity in any of the machines to be allocated to the total processing job required.

As shown in FIG. 1, grid 120 may be made up of a combination of client and server computers. Any computer system with unused resources may be configured to accept grid jobs through network data processing system 100. The grid computers within grid 120 may span the world and may be connected to network 102 through, for example without limitation, private networks, dial-up connections, dedicated Internet connections, gateway services, etc.

A given user may run a computationally intensive job using grid technology by submitting a job to one of the resource machines in grid 120 using a workstation, such as client 108 in FIG. 1. A resource machine will then process the job and return the results to the user. The user may select a particular machine in grid 120 to run the job. Alternatively, a user may submit a job to a grid scheduler that selects a host (resource) to process the job. A grid scheduler may be embodied on a machine in network data processing system 100 such as a server, server 104 for example. If a user sends a job to a grid scheduler, the user is presumed to trust the scheduler to send the job to the right host.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system. Data processing system 300 also may be a tablet computer or laptop computer in addition to taking the form of a PDA.

Figure 4:
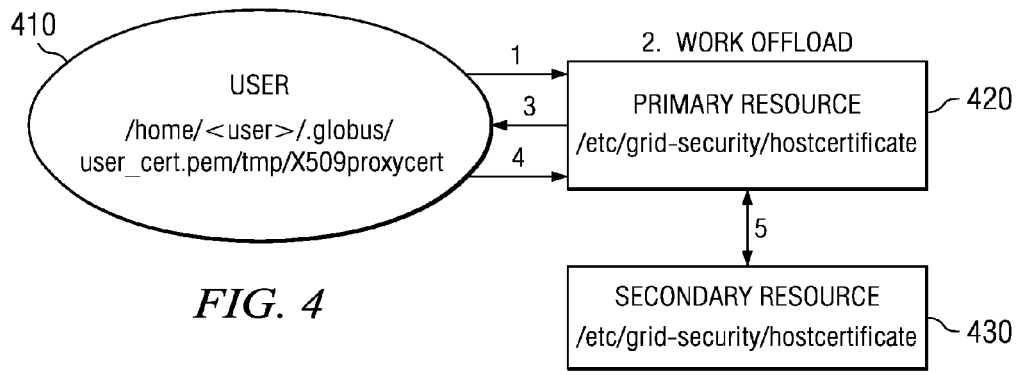
FIG. 4 illustrates a process for offloading a grid job from a primary resource to a secondary resource.

A resource machine in a grid may become overburdened. In this case, a primary resource machine may offload work to a secondary resource machine. FIG. 4 illustrates a process for offloading a grid job from a primary resource to a secondary resource. The user performs authorization with the primary resource. The authorization is typically performed by the simple fact that the user sent the job to the host. If the user did not trust the host, then the user would not have sent the job to the host. That is, the user either initially trusts the primary resource or trusts a grid scheduler to assign the grid job to an appropriate primary resource. The resource authorizes the user by comparing the user's identification (ID) to an authorization list or gridmap file. Each resource in the grid keeps an authorization list or gridmap file that stores the ID and other attributes of each user that is authorized to run jobs on that resource. Often, an administrator for a grid pushes a list to all resources in the grid whenever a change is made to the list. After mutual authentication by exchanging the user's proxy certificate and the primary resource's host certificate, user 410 sends a grid job to primary resource 420.

As illustrated in FIG. 4, in operation 1, primary resource 420 performs mutual authentication with the user machine 410. Mutual authentication may be performed using digital certificates, such as X509 certificates, for example. User 410 may store a certificate, for example, "/home/<user>/.globus/user_cert.pem."

A typical digital certificate describes an end entity, such as a user, by distinguished name, for example (C=US, O=IBM, OU=AIX, CN=JohnUser). In this example, the digital certificate identifies a country (C), an organization (O), an organizational unit (OU), and a common name (CN). The digital certificate also contains the public key of the end entity and is signed by the private key of a trusted certificate authority (CA). Thus, when one receives the digital certificate, one may verify the signature of the trusted CA and trust that the CA properly vetted the identity of the user.

In operation 2, primary resource 420 may determine that the grid job is to be offloaded to secondary resource 430. The primary resource may offload a grid job if its processing resources are no longer underused. For example, the primary resource may receive workload for which the resource is intended, causing the primary resource to no longer have available CPU resources.

In operation 3, the primary resource sends a certificate request to the user machine. User machine 410 then automatically generates a proxy certificate for the primary resource to use for authentication with the secondary resource. These processes are preferably automated, because these grid jobs or programs may run for days. In other words, it is not practical for the user to be present to allow or deny these requests. User machine 410 may then store the proxy certificate, for example, "/tmp/X509proxycert."

A proxy certificate distinguished name is similar to a certificate with a string, such as "/proxy," appended. For example, (C=US, O=IBM, OU=AIX, CN=JohnUser/proxy). The proxy certificate is signed by the certificate, rather than by the CA. In other words, the CA signs the certificate and the certificate, in turn, signs the proxy certificate. When the proxy certificate is received by the remote grid resource, the chain of trust is as follows: 1) I trust the trusted CA and the trusted CA is signing the certificate; 2) Therefore, I trust the certificate; 3) I trust the certificate; therefore, I trust the proxy certificate signed by the certificate; and, 4) Therefore, I trust the proxy certificate.

In operation 4, user machine 410 sends the proxy certificate to primary resource 420. Thereafter primary resource 420 submits a job to secondary resource 430. Mutual authentication then occurs in operation 5 and secondary resource 430 authorizes the user via proxy to run the job.

The advantage of the process shown in FIG. 4 is that a short lifetime is assigned to a proxy certificate. A typical lifetime may be, for example, twenty-four hours. The proxy certificate accompanies a grid job. Therefore, if the proxy certificate is compromised, it will expire within a short time, thus limiting the potential damage. Also, a grid job may move throughout the grid without requiring the user to be attentive, because additional proxy certificates may be automatically generated as needed. This allows the user to submit a grid job with single sign-on no matter how the grid job is distributed within the grid. In other words, the user may simply submit a grid job and walk away.

The primary resource may select a secondary resource based on a set of criteria. In this respect, the primary resource may perform a form of authorization with the secondary resource. However, the user that submitted the job may not necessarily trust the secondary resource or host. Consequently, the secondary resource machine that processes the job may lack the desired, or even necessary, security levels. The machine may have an operating system that is vulnerable to virus attacks or spyware. Or the secondary resource may be malicious and steal the results or the Internet protocol (IP) address of the grid job.

Figure 5:
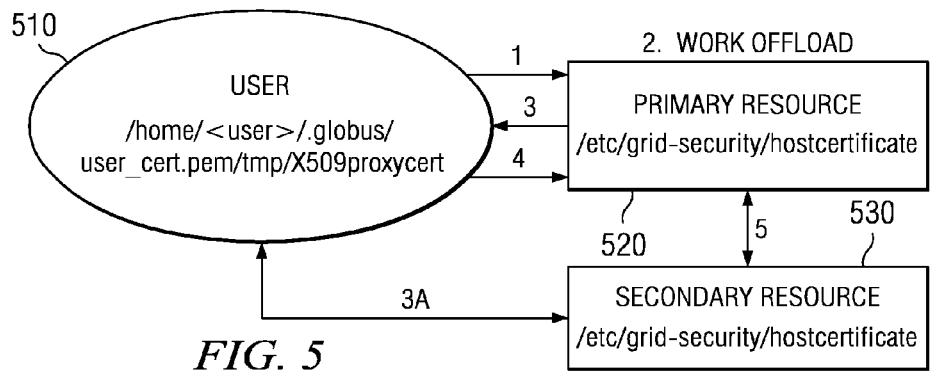
FIG. 5 illustrates a process for offloading a grid job from a primary resource to a secondary resource with grid mutual authorization through proxy certificate generation in accordance with a preferred embodiment of the present invention.

FIG. 5 illustrates a process for offloading a grid job from a primary resource to a secondary resource with grid mutual authorization through proxy certificate generation in accordance with a preferred embodiment of the present invention. The premise behind grid mutual authorization through proxy certificate generation is to leverage or intercept the mutual authentication process to ascertain the following information:

1. The job is being offloaded or distributed beyond the primary resource;
2. The exact instance in time of this occurrence; and,
3. The derived IP address of the secondary resource.

With this information, the user machine running an automated process can discover the detailed information about the secondary resource, decide whether the secondary resource is authorized to run the job, and terminate or sabotage the secondary authentication process, if necessary, thus creating a mutual authorization mechanism.

User 510 sends a grid job to primary resource 520. The user performs authorization with the primary resource. That is, the user either initially trusts the primary resource or trusts a grid scheduler to assign the grid job to an appropriate primary resource. In operation 1, primary resource 520 performs mutual authentication with the user machine 510. Mutual authentication may be performed using digital certificates, such as X509 certificates, for example.

In operation 2, primary resource 520 may determine that the grid job is to be offloaded to secondary resource 530. In operation 3, the primary resource sends a certificate request to the user machine. Responsive to a certificate request from primary resource 520, user machine 510 submits an authorization job in operation 3A directly to the newly identified secondary resource 530, independent of the current grid job being offloaded by primary resource 520.

This authorization job runs on the secondary resource machine and identifies the security elements of the secondary resource. For example, the authorization job may determine whether the secondary resource has the latest operating system and security updates, whether the secondary resource has a trusted operating system, whether there are any conflicting grid jobs also running on this resource, etc. The security information gathered by the authorization job may vary depending upon the implementation. For example, while a user may wish to list the jobs that a secondary resource is running on one implementation, a user may prefer a resource with this command disabled to avoid leaking critical and/or strategic information through covert channels.

The user machine may perform mutual authorization using more static decisions, such as having a black and/or white list, for example. The user machine may use rules, such as trust any resource trusted by the grid virtual organization, but do not trust a particular resource after business hours when monitoring is less intense. The authorization with the secondary resource is mutual, because the secondary resource authorizes the user by comparing a user ID to an authorization list, as discussed above.

If mutual authorization with the secondary resource is successful, user machine 510 generates a valid proxy certificate for the primary resource to use for authentication with the secondary resource. However, if the secondary resource fails the authorization process, user machine 510 generates an invalid proxy certificate.

In operation 4, user machine 510 sends the proxy certificate to primary resource 520. Thereafter primary resource 520 submits a job to secondary resource 530. Mutual authentication then occurs in operation 5 and secondary resource 530 authorizes the user via proxy to run the job. However, if primary resource 520 presents an invalid proxy certificate to secondary resource 530, the secondary resource will not allow the user's grid job to be run. The primary resource will see this error and then search for another secondary resource to offload the job to, returning to operation 2. Thus, the user machine performs mutual authorization with the secondary resource by forcing the secondary resource to either accept or reject the grid job through generation of a valid or invalid proxy certificate.

Figure 6:
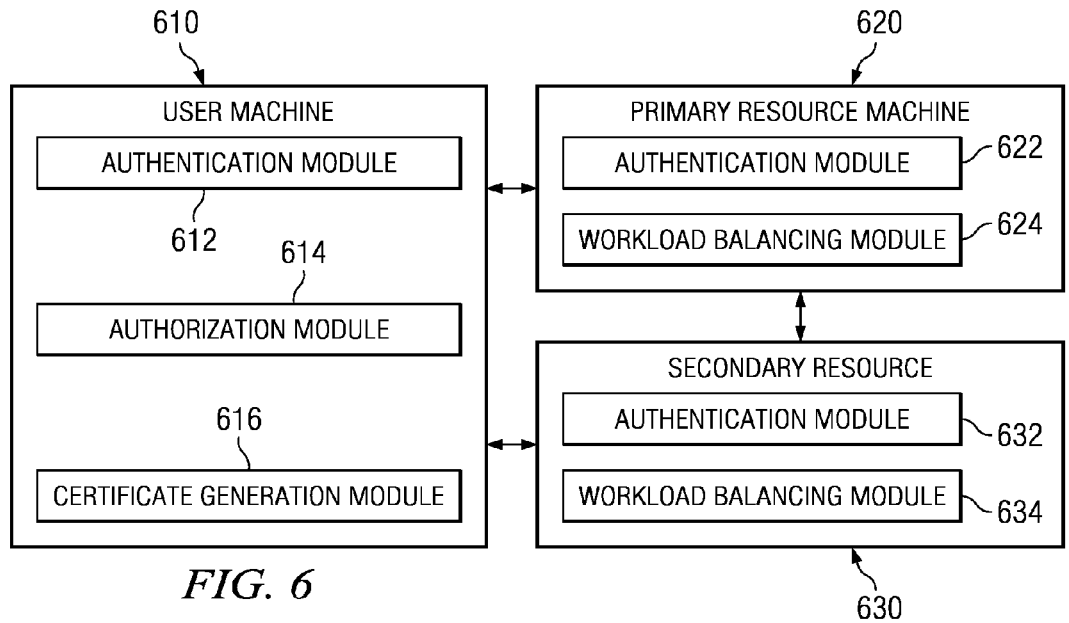
FIG. 6 is a block diagram depicting machines in a grid computing system in accordance with an exemplary embodiment of the present invention.

With reference now to FIG. 6, a block diagram is shown depicting machines in a grid computing system in accordance with an exemplary embodiment of the present invention. User machine 610 includes authentication module 612, certificate generation module 614, and authorization module 612. Primary resource machine 620 includes authentication module 622 and workload balancing module 624. Secondary resource machine 630 includes authentication module 632 and workload balancing module 634.

When primary resource machine 620 receives a grid job from user machine 610, primary resource machine 620 performs authentication with the user machine using authentication module 622. User machine 610 performs this mutual authentication with the primary resource machine through authentication module 612. Primary resource machine 620 may also perform mutual authentication with secondary resource 630 through authentication module 622 in the primary resource machine and authentication module 632 in the secondary resource machine.

Using workload balancing module 624, primary resource machine 620 may decide to offload work to other resources. For example, primary resource machine 620 may offload a grid job that was received form user machine 610 to secondary resource machine 630. Similarly, secondary resource machine 630 may then offload that same grid job to another resource machine (not shown) using workload balancing module 634.

When primary resource machine 620 decides to offload a grid job that was received from user machine 610 to secondary resource machine 630, primary resource machine 620 sends a certificate request to user machine 610. In accordance with an exemplary embodiment of the present invention, user machine 610, responsive to the certificate request from primary resource machine 620, performs mutual authorization with secondary resource machine 630.

The certificate request may identify the secondary resource machine, such as by IP address, for example. Alternatively, user machine 610 may submit a query grid job to primary resource machine 620 inquiring about the IP address of the secondary resource. User machine 610 then makes an authorization determination based on the secondary resource machine using authorization module 614. User machine 610 may submit an authorization job to the newly identified secondary resource 630. This authorization job may run on the secondary resource machine and identify the security elements of the secondary resource. Authorization module 614 may also perform mutual authorization using more static decisions, such as having a black and/or white list, for example.

If mutual authorization with secondary resource machine 630 is successful, user machine 610 generates a valid proxy certificate using certificate generation module 616. However, if secondary resource machine 630 fails the authorization process, user machine 610 generates an invalid proxy certificate using certificate generation module 616.

User machine 610 sends the proxy certificate to primary resource machine 620. Thereafter primary resource machine 620 submits a job to secondary resource machine 630. Mutual authentication then occurs between authentication module 622 and authentication module 632 and secondary resource 630 authorizes the user via proxy to run the job. However, if primary resource machine 620 presents an invalid proxy certificate to secondary resource machine 630, the secondary resource machine will not allow the user's grid job to be run.

The primary resource machine will see this error and then search for another secondary resource to offload the job to using workload balancing module 624.

Figure 7:
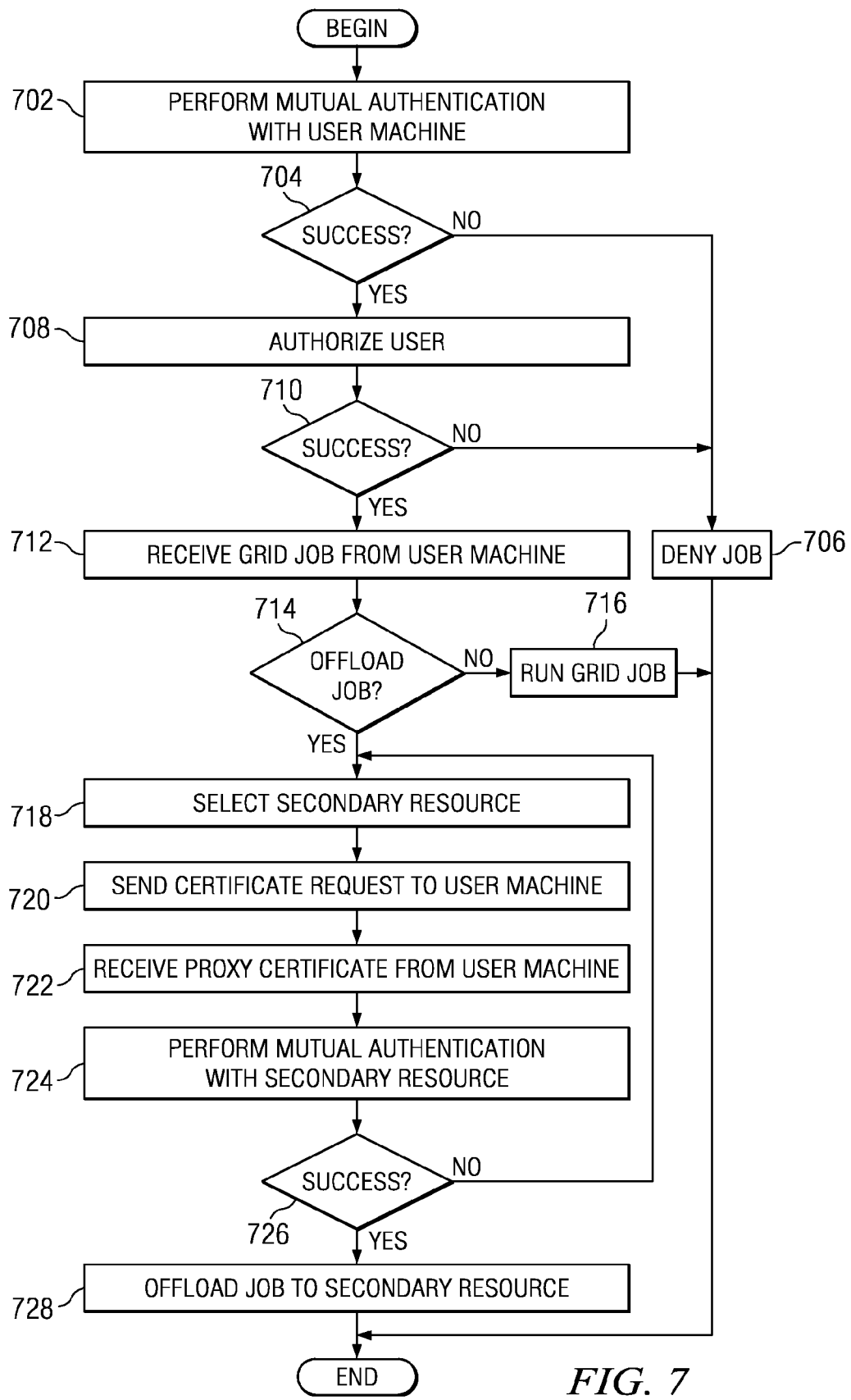
FIG. 7 is a flowchart illustrating the operation of a resource machine in a grid computing system in accordance with an exemplary embodiment of the present invention.

FIG. 7 is a flowchart illustrating the operation of a resource machine in a grid computing system in accordance with an exemplary embodiment of the present invention. The process begins when request to process a grid job is received and performs mutual authentication with the user machine (block 702). Then, a determination is made as to whether the authentication is successful (block 704). If the authentication is not successful, the process denies the grid job (block 706) and ends.

If the authentication is successful in block 704, the process authorizes the user (block 708) and a determination is made as to whether authorization is successful (block 710). If the authorization is not successful, the process denies the grid job (block 706) and ends.

If the authorization is successful in block 710, the process receives the grid job from the user machine (block 712) and a determination is made as to whether to offload the grid job (block 714). The determination in block 714 may be made at any time before the grid job is processed by the primary resource machine. If the grid job is not offloaded, the process runs the grid job (block 716) and the process ends.

If the grid job is to be offloaded in block 714, the process selects a secondary resource to which to send the grid job (block 718). Then, the process sends a certificate request to the user machine (block 720) and receives a proxy certificate from the user machine (block 722). Thereafter, the process performs mutual authentication with the secondary resource using the proxy certificate (block 724).

A determination is made as to whether authentication with the secondary resource is successful (block 726). If authentication is not successful, the process returns to block 718 to select another secondary resource. However, if authentication with the secondary resource is successful in block 726, the process offloads the grid job to the secondary resource (block 728) and the process ends.

Figure 8:
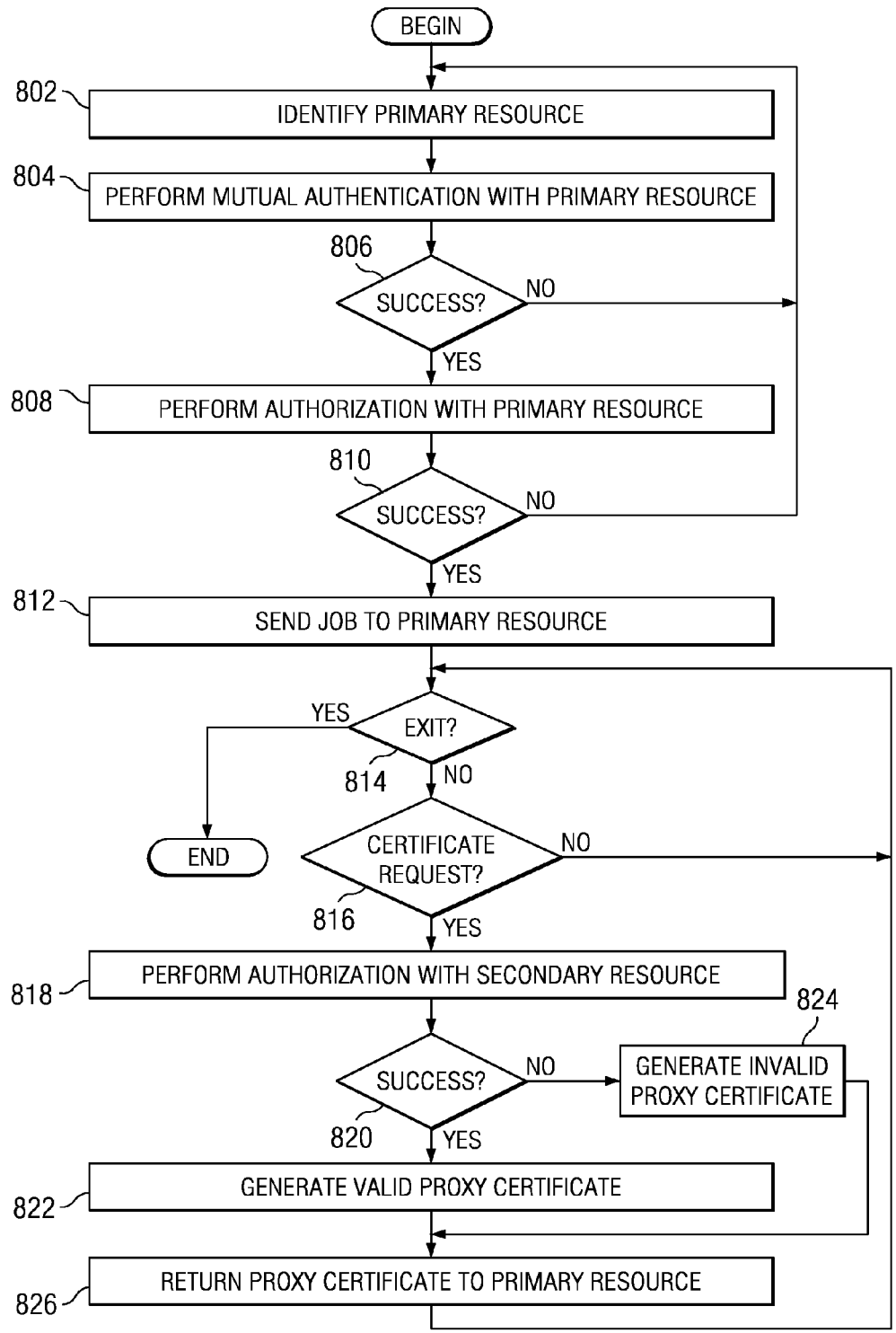
FIG. 8 is a flowchart illustrating the operation of a user machine in a grid computing system in accordance with an exemplary embodiment of the present invention.

FIG. 8 is a flowchart illustrating the operation of a user machine in a grid computing system in accordance with an exemplary embodiment of the present invention. The process begins when a grid job is to be submitted to a resource in a grid computing system. The process identifies a primary resource (block 802) and performs mutual authentication with the primary resource (block 804). A determination is made as to whether authentication is successful (block 806). If authentication is not successful, the process returns to block 802 to identify another primary resource.

If authentication is successful in block 806, the process performs authorization with the primary resource (block 808). Then, a determination is made as to whether authorization with the primary resource is successful (block 810). If authorization is not successful, the process returns to block 802 to identify another primary resource.

If authorization is successful in block 810, the process sends the grid job to the primary resource (block 812). A determination is made as to whether an exit condition exists (block 814). An exit condition may exist, for example, when the user machine is shut down or the grid computing software is closed on the user machine. An exit condition may also exist when results for the grid job are received. If an exit condition exists, the process ends.

If, however, an exit condition does not exist in block 814, a determination is made as to whether a certificate request is received from the primary resource (block 816). If a certificate request is not received, the process returns to block 814 to determine whether an exit condition exists.

If a certificate request is received from the primary resource in block 816, the process performs authorization with the secondary resource (block 818). Next, a determination is made as to whether authorization with the secondary resource is successful (block 820). If authorization is successful in block 820, the process generates a valid proxy certificate (block 822); otherwise, the process generates an invalid proxy certificate (block 824). After a valid or invalid proxy certificate is generated in one of blocks 822 and 824, the process returns the proxy certificate to the primary resource. Thereafter, the process returns to block 814 to determine whether an exit condition exists.

Thus, the present invention solves the disadvantages of the prior art by providing a mechanism for grid mutual authorization through proxy certificate generation. Resource machines in a grid are able to authorize the user by comparing a user ID to an authorization list or gridmap file. The present invention allows the user machines to be configured to control the authorization of the distribution of its grid jobs without changing the grid software on the grid resources and still working within the flow of the existing grid mutual authorization and one-way authorization. The mechanism of the present invention maintains a single sign-on paradigm while allowing the grid user to submit the job and walk away.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for authorizing offloading of a grid job in a grid computing system, the apparatus comprising:
   a user data processing system for submitting a grid job to a primary grid resource;
   the primary grid resource, responsive to a determination by the primary grid resource to offload the grid job, for identifying a secondary grid resource that is to run the grid job;
   the primary grid resource, responsive to identifying the secondary grid resource, for generating a certificate request;
   the primary grid resource for sending the certificate request to the user data processing system;

the user data processing system, responsive to receiving the certificate request, for performing authorization with the secondary grid resource; and the user data processing system, responsive to authorization with the second grid resource failing, for generating an invalid proxy certificate and sending the invalid proxy certificate to the primary grid resource.

2. The apparatus of claim 1, further comprising:

the user data processing system, responsive to authorization with the second grid resource succeeding, for generating a valid proxy certificate and sending the valid proxy certificate to the primary grid resource.

3. The apparatus of claim 1, wherein the user data processing system for submitting a grid job to a primary grid resource includes the user data processing system for submitting the grid job to a grid scheduler, wherein the grid scheduler selects a primary grid resource and sends the grid job to the primary grid resource.

4. The apparatus of claim 1, wherein the primary grid resource for identifying a secondary grid resource that is to run the grid job includes the user data processing system for submitting a query grid job to the primary grid resource inquiring about an identity of the secondary grid resource.

5. The apparatus of claim 1, wherein the primary grid resource for identifying a secondary grid resource that is to run the grid job includes detecting an address of the secondary grid resource in the certificate request.

6. The apparatus of claim 1, wherein the user data processing system for performing authorization with the secondary grid resource includes the user data processing system for submitting an authorization job to the secondary grid resource.

7. The apparatus of claim 6, wherein the authorization job identifies security elements of the secondary resource.

8. A computer program product stored in a non-transitory computer readable medium, for authorizing offloading of a grid job in a grid computing system, the computer program product comprising:

instructions for submitting a grid job to a primary grid resource, by a user data processing system;

instructions, responsive to a determination by the primary grid resource to offload the grid job, for identifying a secondary grid resource that is to run the grid job;

instructions, responsive to identifying the secondary grid resource, for generating a certificate request;

instructions for sending the certificate request to the user data processing system;

instructions, responsive to receiving the certificate request by the user data processing system, for performing authorization with the secondary grid resource; and instructions, responsive to authorization with the second grid resource failing, for generating an invalid proxy certificate and sending the invalid proxy certificate to the primary grid resource.

* * * * *